(12) United States Patent
Thathapudi et al.

(10) Patent No.: US 8,121,135 B2
(45) Date of Patent: Feb. 21, 2012

(54) DISCOVERING PATH MAXIMUM TRANSMISSION UNIT SIZE

(75) Inventors: Timothy N. Thathapudi, Bangalore (IN); Srinivasa D. Satyanarayana, Mysore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 261 days.

(21) Appl. No.: 12/490,093

(22) Filed: Jun. 23, 2009

(65) Prior Publication Data

US 2010/0322249 A1 Dec. 23, 2010

(51) Int. Cl.
*H04L 12/28* (2006.01)
(52) U.S. Cl. ......... 370/401; 370/394; 370/252; 370/474
(58) Field of Classification Search .................. None
See application file for complete search history.

(56) References Cited

U.S. PATENT DOCUMENTS

| | | | |
|---|---|---|---|
| 5,959,974 A | 9/1999 | Badt et al. | |
| 7,483,376 B2 | 1/2009 | Banerjee et al. | |
| 7,542,471 B2 * | 6/2009 | Samuels et al. | 370/392 |
| 2004/0071140 A1 | 4/2004 | Jason et al. | |
| 2005/0281288 A1 | 12/2005 | Banerjee et al. | |
| 2007/0171828 A1 * | 7/2007 | Dalal et al. | 370/235 |
| 2008/0165775 A1 * | 7/2008 | Das et al. | 370/392 |
| 2008/0298376 A1 | 12/2008 | Takeda et al. | |

FOREIGN PATENT DOCUMENTS

WO 03084144 A1 10/2003

OTHER PUBLICATIONS

Information Sciences Institute, RFC: "791, Internet Protocol: Darpa Internet Program Protocol Specification," Sep. 1981, 49 pp.
Mogul et el., "RFC1191-Path MTU Discovery," Network Working Group, Nov. 1990, 17 pp.
Lahey, "RFC2923—TCP Problems with Path MTU Discovery," Network Working Group, Sep. 2000, 12 pp.
Cisco Systems, Inc., "Resolve IP Fragmentation, MTU, MSS, and PMTU Issues with GRE and IPSEC," Oct. 2006, 26 pp.
Mathis et al., RFC 4821, "Packetization Later Path MTU Discovery," Network Working Group, Mar. 2007, 30 pp.
European Search Report for EP Application No. 10158644.4 dated Jun. 9, 2010, 8 pp.

* cited by examiner

*Primary Examiner* — Duc C Ho
(74) *Attorney, Agent, or Firm* — Shumaker & Sieffert, P.A.

(57) ABSTRACT

Intermediate network devices, such as routers, are configured to discover a maximum transmission unit (MTU) for a path between two network endpoints by removing data from packets when the packet size exceeds a link MTU to a next hop. An example intermediate network device includes a forwarding engine to determine an interface card through which to forward a received packet and to determine a link MTU for a link corresponding to the interface card, wherein the received packet comprises a header and a payload, the header indicating not to fragment the packet, and a PMTU determination module to determine whether a size of the received packet exceeds the link MTU, and to remove a portion of data from the payload of the packet, discard the removed portion, and adjust the header of the packet according to the removed portion when the size of the received packet exceeds the link MTU.

35 Claims, 5 Drawing Sheets

DISCOVERING PATH MAXIMUM TRANSMISSION UNIT SIZE

TECHNICAL FIELD

This disclosure relates to communication within packet-based network computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Network devices and network links are bounded as to the size of packets or other blocks of data that can be transmitted between two given devices across a given link. This upper-bound is commonly referred to as a "maximum transmission unit" (MTU), also commonly referred to as a "maximum transfer unit." RFC 791 establishes a lower-bound for MTUs of 576 bytes. That is, RFC 791 requires that network devices and network links be capable of supporting MTUs of at least 576 bytes. However, manufacturers are free to support larger MTUs, and many manufacturers frequently do so. Further details on RFC 791 can be found in "INTERNET PROTOCOL: DARPA INTERNET PROGRAM PROTOCOL SPECIFICATION," Information Sciences Institute, University of Southern California, September 1981, the entire contents of which are incorporated herein by reference.

When two segments of a route or path between two networking devices support different MTUs, one of the devices involved in the communication session typically resolves the MTU for the path. One conventional method for doing so, described by RFC 1191, involves the use of the Internet Control Message Protocol (ICMP) to determine the MTU for the path. In particular, RFC 1191 prescribes path MTU discovery (PMTUD) by sending a plurality of different-sized packets, each with a "don't fragment" (DF) flag set. When a downstream router receives a packet that is too large for the subsequent link, and with the DF flag set, the router will return an ICMP "Destination Unreachable" message and discards the packet. The source router then reduces its assumed PMTU size for the path and ultimately determines that the PMTU is the size of a penultimate packet sent before receiving an ICMP destination unreachable message. Further details can be found in RFC 1191 by J. Mogul et al., entitled "PATH MTU DISCOVERY," Network Working Group, Internet Engineering Task Force (IETF), November 1990, the entire contents of which are incorporated herein by reference.

However, certain problems exist with the method proposed by RFC 1191. For example, some routers and networks do not support ICMP messages, and other routers and networks actively block ICMP messages. This often leads to the problem described by RFC 2923 as the "PMTUD black hole" and causes TCP timeouts. Further details can be found in RFC 2923 by J. Mogul et al., entitled "TCP PROBLEMS WITH PATH MTU DISCOVERY," Network Working Group, Internet Engineering Task Force (IETF), September 2000, the entire contents of which are incorporated herein by reference.

Moreover, the method proposed in RFC 1191 requires multiple iterations of packets to be sent, often without meaningful data, only for the purpose of discovering the PMTU. This leads to wasted bandwidth and communication delays. In addition, systems that support ICMP for the purpose of PMTUD can be vulnerable to a denial of service (DoS) attack designed to exploit this behavior.

SUMMARY

In general, this disclosure describes techniques for discovering a maximum transmission unit (MTU) for a network path. The techniques involve a source network device establishing a communication session with a destination network device, such as by use of the conventional TCP three-way handshake, and then sending a first packet carrying application-layer data and marked for forwarding without fragmentation. That is, the source device sends a first packet carrying application-layer data at a maximum supported packet size for the link connected to the source device and also sets a "don't fragment" (DF) flag of the first packet.

Routers, or other intermediate networking devices, along a route between the source device and a destination network device are configured to check the size of a received packet against the MTU of a link connecting the router to the next hop along the route. When the size of the packet carrying application-layer data is greater than the MTU of the link, and when the DF flag is set, the router modifies the first packet to accommodate the MTU of the link by sending only the portion of the first packet that will not exceed the MTU, and drops the rest. Rather than fragmenting the packet, the router reconstructs the portion of the packet as a true IP datagram. To construct a true IP datagram, the router also updates the TCP and IP headers, e.g., the IP length value, the IP checksum, the TCP length value, and the TCP checksum. In some examples, the router only modifies the IP length value and/or TCP length value without recalculating the checksums for this first packet.

When a destination network device, that is, the intended recipient device of the packet, receives the portion of the first packet, the destination device acknowledges receipt of this portion of the first packet. In particular, the destination device calculates an acknowledgement sequence number based on the size of the received portion of the first packet and the starting sequence number. For example, when the portion of the first packet received by the destination network device comprises 500 bytes, and the first sequence number (the initial sequence number) is X, the destination network device sends an acknowledgement with sequence number "X+501." The initial sequence number X, for the purposes of this example, comprises the initial sequence number following the three-way handshake to initiate the network session, rather than the initial sequence number included in a synchronization packet (SYN packet). The source network device then determines that the path MTU (PMTU) for the network path from the originating network device to the destination device is 500 bytes, using the acknowledged sequence number. That is, the source device calculates that the PMTU is equal to the acknowledgement sequence number minus the starting sequence number minus one, e.g., 501−(X+1). The source network device then transmits bytes 501-1000 and subsequent bytes of the network session in at-most 500-byte increments, in this example.

Moreover, in accordance with the techniques described herein, the source network device that originated the communication session determines that the "lost" portion of the first packet is lost due to having exceeded the MTU of the path, rather than, for example, congestion. Therefore, the source network device does not reduce its transmission rate or otherwise initiate congestion control handling in response to receiving the acknowledgement from the destination network device until the MTU for the network path has been ultimately determined. That is, network devices implementing the techniques of this disclosure are configured not to treat a dropped segment of a first packet as a sign for congestion control until the dropped segment size is equal to what the sender has sent.

In one example, a method includes receiving, with an intermediate network device, a packet comprising a header and a payload, wherein the header of the packet indicates that the packet is not to be fragmented, and determining a link maximum transmission unit (link MTU) for a link to a next hop for the packet. When a size of the packet exceeds the link MTU, the method comprises removing, with the intermediate network device, a portion of data from the payload of the packet, discarding the removed portion, adjusting the header of the packet according to the removed portion, and forwarding the packet to the next hop.

In another example, an intermediate network device includes a plurality of interface cards configured to receive and forward packets of a network, and a forwarding engine configured to determine one of the plurality of interface cards through which to forward a received packet, and to determine a link maximum transmission unit (link MTU) for a link corresponding to the one of the plurality of interface cards, wherein the received packet comprises a header and a payload, wherein the header of the packet indicates that the packet is not to be fragmented. The intermediate network device also includes a path maximum transmission unit determination (PMTUD) module configured to determine whether a size of the received packet exceeds the link MTU, and to remove a portion of data from the payload of the packet, discard the removed portion, and adjust the header of the received packet according to the removed portion when the size of the received packet exceeds the link MTU.

In another example, a computer-readable medium, such as a computer-readable storage medium, contains, e.g., is encoded with, instructions that cause a programmable processor of an intermediate network device to receive a packet comprising a header and a payload, wherein the header of the packet indicates that the packet is not to be fragmented, determine a link maximum transmission unit (link MTU) for a link to a next hop for the packet, when a size of the packet exceeds the link MTU, remove, with the intermediate network device, a portion of data from the payload of the packet, discard the removed portion, adjust the header of the packet according to the removed portion, and forward the packet to the next hop.

In another example, a method includes sending, with a first network device, a packet to a second network device, wherein the packet comprises a header and a payload, wherein the payload comprises application-layer data and wherein the header comprises an initial sequence number, wherein the header of the packet indicates that the packet is not to be fragmented, receiving an acknowledgement for the packet comprising an acknowledgement sequence number, and calculating, with the first network device, a path maximum transmission unit (PMTU) according to a difference between the acknowledgement sequence number and the initial sequence number.

The techniques of this disclosure may provide several advantages. For example, a network device applying the techniques of this disclosure may determine the MTU for a network path to a destination device in a single iteration, that is, in a single communication between the endpoint network devices. Because the techniques of this disclosure do not rely on Internet Control Message Protocol (ICMP) messages, the techniques can be used to determine the MTU for the network path even when a network or network device along the path has been configured to block ICMP messages. Therefore, network devices may safely disable ICMP without losing the ability to discover the PMTU, in accordance with these techniques.

Although one or more routers along the path may fragment the first packet of a network session for the purpose of discovering the PMTU, the routers along the path generally need not participate in fragmentation of packets during a network session, thus reducing the load on the routers with respect to fragmentation. Because the first packet of the network session used to determine the MTU of the path includes actual data for the network session, no test packet is required for successful implementation of these techniques. Therefore, the techniques of this disclosure may reduce frivolous or content-free packets sent during a network session. Because all packets of the network session may comprise TCP segments, the packets used to determine the PMTU will not likely be blocked or dropped by an intrusion detection system, because the packets conform to TCP.

The details of one or more examples are set forth in the accompanying drawings and the description below. Other features, objects, and advantages will be apparent from the description and drawings, and from the claims.

DETAILED DESCRIPTION

Figure 1:
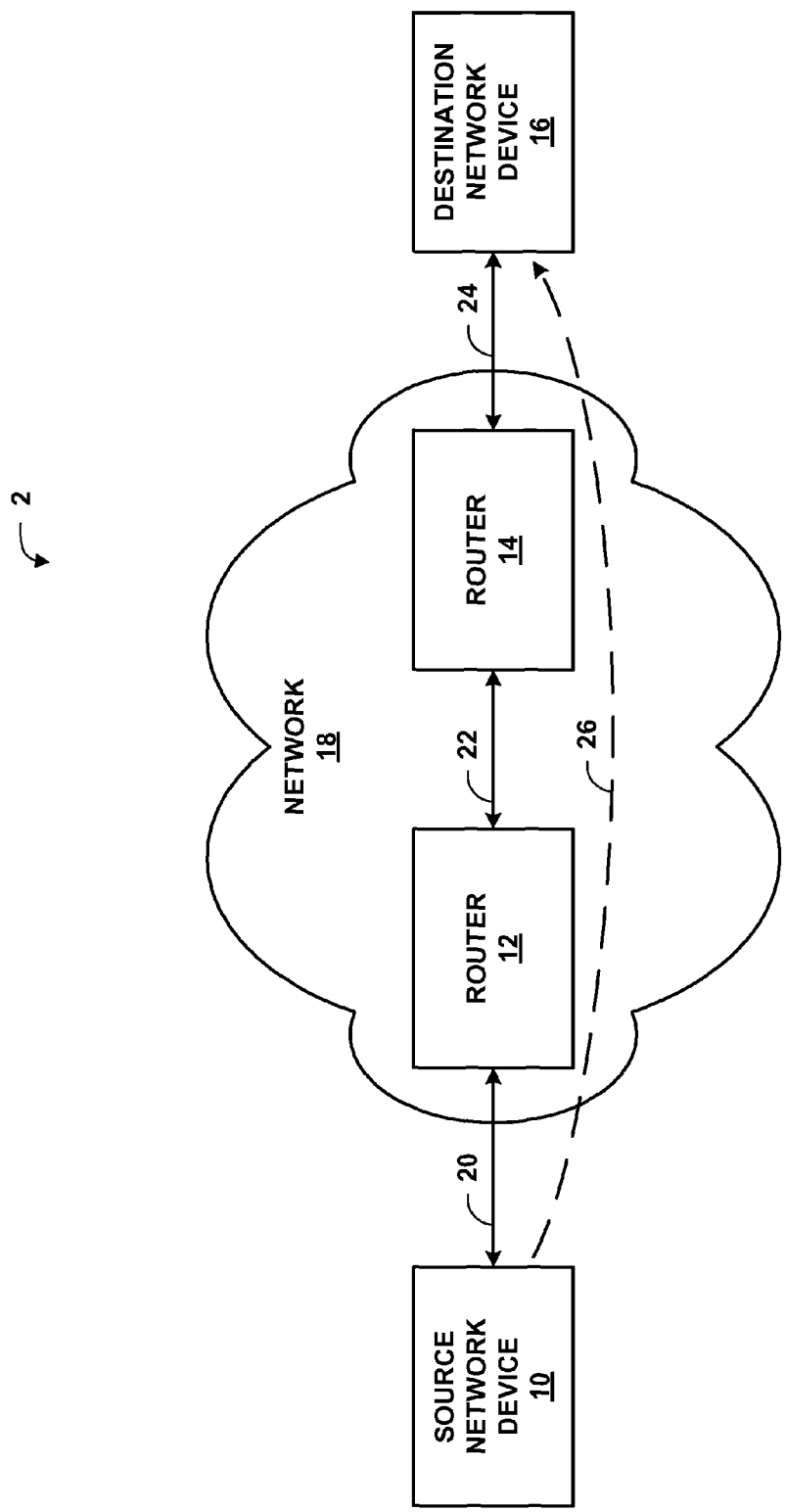
FIG. 1 is a block diagram illustrating an example system in which a source network device determines a path maximum transmission unit (PMTU).

FIG. 1 is a block diagram illustrating an example system 2 in which a source network device 10 determines a path maximum transmission unit (PMTU) in accordance with the techniques of this disclosure. In the example of FIG. 1, source network device 10 determines the PMTU for path 26 between source network device 10 and destination network device 16. Source network device 10 is coupled to destination network device 16 by path 26, which traverses network 18 and, in particular, through intermediate routers 12 and 14. Although two routers are depicted in the example of FIG. 10, the techniques of this disclosure are applicable to any number and any type of intermediate network devices between two endpoint devices, such as source network device 10 and destination network device 16. Such intermediate devices include, for example, routers, gateways, switches, hubs, bridges, intrusion detection and prevention devices, firewalls, wireless access points, modems, and other such network devices.

In the example of FIG. 1, source network device 10 is coupled to router 12 via network link 20. Router 12 is coupled to router 14 via network link 22. Router 14 is coupled to destination network device 16 via network link 24. Any of links 20, 22, and 24 may comprise wireless or wired links, such as Ethernet links, Gigabit Ethernet links, wireless 802.11 links, satellite links, cable links, digital subscriber line (DSL) links, copper PHY links, fiber optic links, or other suitable physical or wireless transmission media. In accordance with the techniques of this disclosure, source network device 10 calculates the PMTU of path 26 as the minimum link MTU of links 20, 22, and 24.

A link MTU is the MTU of a link (or network connection) that couples two network devices. That is, a first link MTU is defined for link 20 between source network device 10 and router 12. The first link MTU of link 20 is the largest unit of data that can be sent between source network device 10 and router 12 across link 20. Similarly, a second link MTU is defined for link 22 between router 12 and router 14, and a third link MTU is defined for link 24 between router 14 and destination network device 16. The path MTU is the MTU supported by each network device and network link along a path between two endpoint devices. In accordance with the techniques of this disclosure, source network device 10 calculates the path MTU for path 26 as minimum(first link MTU, second link MTU, third link MTU). That is, source network device 10 determines that the PMTU of path 26 is the minimum of all of the link MTUs of path 26.

In one example, the first link MTU of link 20 is 3,300 bytes, the second link MTU of link 22 is 5,000 bytes, and the third link MTU of link 24 is 1,500 bytes. In this example, source network device 10 would determine that the PMTU of path 26 is 1,500 bytes, because 1,500 bytes is the minimum of all of the link MTUs. By determining that the PMTU is equal to the minimum of the link MTUs, each device and link along the path will be able to support the determined PMTU. That is, each device and link will support transmission units at least as large as those of the PMTU. In the example above, where source network device 10, router 12, and link 20 comprise a link MTU of 3,300 bytes, source network device 10, router 12, and link 20 will also support transmission units of 1,500 bytes.

Source network device 10 and routers 12, 14 act in concert to determine the PMTU of path 26. That is, each of source network device 10 and routers 12 and 14 are configured according to the techniques of this disclosure. Destination network device 16, acting as a server in this example, need not be specially configured for source network device 10 to be able to calculate the PMTU of path 26. Source network device 10 sends a first packet comprising application data to destination network device 16 across path 26. References to the "first packet" in this disclosure generally refer to the first packet of application-layer data following the establishment of the network session, e.g., following the TCP three-way handshake. Source network device 10 sets the "don't fragment" (DF) flag of the first packet to inform routers 12 and 14 not to fragment the packet.

In general, packets exchanged throughout system 2 comprise one or more headers and a payload. Packets often comprise headers for each layer of the open systems interconnection (OSI) networking model. In the example of a TCP/IP packet, such a packet comprises both a TCP header and an IP header. The payload of a packet generally comprises application-layer data. In accordance with the techniques of this disclosure, routers 12 and 14 remove data from the payload of the packet and may modify various data of the headers of the packet, as described in greater detail below, when the size of the packet is greater than the link MTU of the link to the next hop and when the "don't fragment" (DF) flag of an IP header is set. The DF flag of the IP header indicates that the packet is not to be fragmented. Although this disclosure generally refers to the DF flag as the flag that indicates that the packet is not to be fragmented, other examples may use other methods, such as a different flag or bit, to indicate that the packet is not to be fragmented. In this manner, the techniques of this disclosure are generally applicable to a packet comprising a header, wherein the header of the packet indicates that the packet is not to be fragmented. In one example, for a TCP/IP packet, routers 12 and 14 may modify one or more of a TCP size value, an IP length value, and checksums of the TCP header and/or the IP header. In some examples, in which routers 12 and 14 do not adjust the checksums of either the TCP header or the IP header, destination network device 16 may be configured to perform a relaxed checksum evaluation. That is, because data has been removed without recalculating the checksum, the checksum will almost certainly be incorrect. A potential tradeoff in performance of the router gained by omitting the checksum recalculation may outweigh the potential for data errors in the payload ultimately received by the endpoint device, e.g., destination network device 16. In some examples, only the TCP checksum is not re-calculated on routers along a route between a source network device and a destination network device, and the destination network device does not validate the TCP checksum; thus the IP checksum may continue to be recalculated along the route and validated at the destination network device.

Routers 12 and 14 are configured to treat packets with the DF flag set in a different manner than such packets are traditionally handled. Conventional routers, upon receiving a packet that exceeds the size of the link MTU of the next hop with the DF flag set, do not fragment the packet, and may be configured to discard the packet and send an Internet Control Message Protocol (ICMP) message to the sending device, in particular, a message that indicates that the packet is too large and cannot be fragmented. In accordance with the techniques described herein, routers 12 and 14, on the other hand, are configured to handle packets with the DF flag set in a different manner than conventional routers would. For example, routers 12 and 14 are configured to modify such a packet such that a portion of the packet payload that will fit the link MTU of the next hop will nevertheless be transmitted, and the rest of content of the packet is removed from the first packet and dropped. The modified packet comprises a true IP datagram and is not a fragmented packet. For example, the modified packet does not have the "more fragments" flag set. The modified packet also does not have fragmentation offset information set.

For example, in accordance with the example link MTUs described above, source network device 10 may send a first packet comprising 3,300 bytes of data to router 12. Source network device 10 also sets the DF flag of this first packet. Upon receiving the first packet, router 12 determines that 3,300 bytes is less than the link MTU of link 22 (5,000 bytes), so router 12 forwards the packet to router 14. Upon receiving the first packet, router 14, however, determines that 3,300 bytes is greater than the link MTU of link 24 (1,500 bytes). Therefore, router 14 drops data from the first packet such that the modified packet will not exceed 1,500 bytes. In this example, router 14 removes 1,800 bytes of application-layer data from the payload of the first packet.

Router 14 also modifies headers of the modified first packet according to the data that remains, such as the transmission control protocol (TCP) header and Internet protocol (IP) header. In one example, router 14 sets the size field of the TCP header according to the new size of the TCP segment of the modified first packet. Router 14 may also recalculate the checksum of the TCP header. In one example, router 14 also sets the length field of the IP header according to the new size of the IP datagram of the modified first packet. Router 14 may also recalculate the checksum of the IP header. In various examples, router 14 performs any or all of these header modifications in any combination.

Moreover, routers 12 and 14 are configured to modify packet such that the packet nevertheless will be considered by downstream devices as properly formed whole packet and not as a packet fragment. For example, in some embodiments, router 14 does not set the "more fragments" (MF) flag of the IP header, nor does router 14 set a value for the fragmentation offset value in the IP header. In some examples, e.g., where the MF bit is set, router 14 clears the MF flag of the IP header to indicate that the modified packet does not include additional fragments. Therefore, the packet sent by router 14 to destination network device 16 is considered a true IP datagram and not a fragmented packet. As will be discussed below, source network device 10 will send the portion of the first packet that was dropped by router 14 in a subsequent communication. Thus, routers 12 and 14 need not expend resources to perform fragmentation, but instead merely recalculate various portions of the packet headers when a packet is modified according to these techniques. Router 14 may therefore discard the removed portion of the payload of the packet without forwarding this removed portion to any other network device. Because only certain portions of the headers are modified, routers 12 and 14 may execute these techniques in a forwarding plane, thus not burdening other processes or hardware. Router 14 also does not need to send an ICMP message to source network device 10 or router 12 to indicate that the packet is too large for the link MTU.

In one example, router 14 does not recalculate either of the checksums of the first packet. Instead, in this example, routers 12, 14 and network devices 10, 16 are configured to use a "relaxed" checksum for the first packet or first N packets of a network communication. Thus although the checksums of the TCP header and the IP header will not accurately represent the authenticity of the payloads thereof, destination network device 16 will nevertheless accept the data as accurate, in this example. Destination network device 16, in one example, applies a relaxed checksum when the DF flag of a packet is set and validates the data using the checksum when the DF flag is not set.

After receiving the modified first packet from router 14, destination network device 16 acknowledges receipt of the bytes that were actually received. That is, in accordance with TCP, destination network device 16 sends an acknowledgement comprising a sequence number corresponding to the initial sequence number (following the TCP three-way handshake) plus the number of bytes received in the modified first packet to source network device 10. In the example above, the sequence number in the acknowledgement corresponds to the initial sequence number plus 1,500. Because the modified packet comprises a true IP datagram, rather than a fragment, destination network device 16 confirms receipt of this data in accordance with TCP and destination network device 16 need not receive any special configuration to acknowledge receipt of this modified packet. In some examples, destination network device 16 records the size of the modified first packet as the PMTU for path 26.

In some examples, destination network device 16 supports selective acknowledgement (SACK). When a network device supports selective acknowledgement, the network device explicitly acknowledges each received packet, as opposed to the standard TCP cumulative acknowledgement scheme. When destination network device 16 is generally configured to support SACK, destination network device 16 may disable SACK for a first received packet or the first N packets of a communication session. In particular, source network device 10 does not set the SACK-permitted option in the SYN packet of the three-way handshake. In this manner, destination network device 16 will not perform SACK, because SACK will be disabled. Additional details regarding SACK, and the disabling thereof, are described in RFC 2018, entitled "TCP Selective Acknowledgement Options," by M. Mathis et al., Sun Microsystems, October 1996, which is incorporated by reference herein in its entirety.

After receiving the acknowledgement from destination network device 16, source network device 10 calculates the PMTU based on the sequence number in the acknowledgement. In one example, source network device 10 subtracts the value of the initial sequence number plus one (INS+1) from the sequence number of the acknowledgement and sets this difference as the PMTU of path 26. That is, for initial sequence number X, and for acknowledged sequence number Y, source network device 10 determines the PMTU of path 26 by calculating PMTU=Y−(X+1).

After source network device 10 has determined the PMTU of path 26, source network device 10 sends packets that are no larger than the determined PMTU during a communication session with destination network device 16. In some examples, source network device 10 sends a message to destination network device 16 that indicates the determined PMTU for path 26, such that destination network device 16 will also not send packets larger than the PMTU for path 26 to source network device 10. In other examples, as discussed above, destination network device 16 records the size of the received, modified packet as the PMTU for path 26.

Conventional network devices may be configured to initiate congestion control when less than all of the data sent during a network session is timely acknowledged. However, source network device 10 has been modified so as not to initiate congestion control when destination network device 16 acknowledges less than the full amount of data sent by source network device 10 in the first packet. Instead, source network device 10 is configured to recognize that the loss of the data from the first packet is caused as a result of the size of the first packet exceeding the PMTU of path 16, rather than as a result of congestion. However, following the first packet, source network device 10 may initiate congestion control when less than the full amount of data transmitted is acknowledged by destination network device 16. In one example, source network device 10 will only initiate congestion control when, for packet sequence number X and received acknowledgement Y, Y−(X+1)=0 or 1. That is, destination network device 16 will not have received the entire TCP segment, in which case source network device 10 initiates congestion control. When instead Y−(X+1)>1, destination network device 16 has received Y−(X+1) bytes of data.

Because source network device 10 destination network device 16 does not send packets larger than the PMTU for path 26 after configuring the PMTU, routers 12 and 14 need not fragment packets sent from source network device 10 to destination network device 16. Therefore, routers 12 and 14 need not expend computational resources to fragment packets of the network session from network devices 10 to destination network device 16. This may assist in preventing routers 12 and 14 from becoming overburdened. To the extent that routers 12 and 14 modify any of the packets, routers 12 and 14 may modify TCP and/or IP headers of the packets, which may be accomplished in the forwarding planes of routers 12 and 14.

In this manner, source network device 10 is able to determine the PMTU of path 26 without relying on receipt of ICMP messages from routers 12 and 14. Because, routers 12 and 14 need not support or enable ICMP, routers 12 and 14 may remain unexposed to ICMP flood attacks that may result in denial of service. Network devices 10 and 16 also do not need to support or enable ICMP in order to successfully perform the techniques of this disclosure. Moreover, source network device 10 is able to determine the PMTU of path 26 in a single iteration, without sending test or probe packets to destination network device 16. That is, source network device 10 is able to determine the PMTU of path 26 using a first packet comprising application-layer data following a TCP three-way handshake after that first packet has been acknowledged by destination network device 16, without sending a plurality of additional probe or test packets of varying sizes. Source network device 10 is also able to dynamically and automatically determine the PMTU of path 26, without needing an administrator to configure the PMTU for source network device 10.

Figure 2:
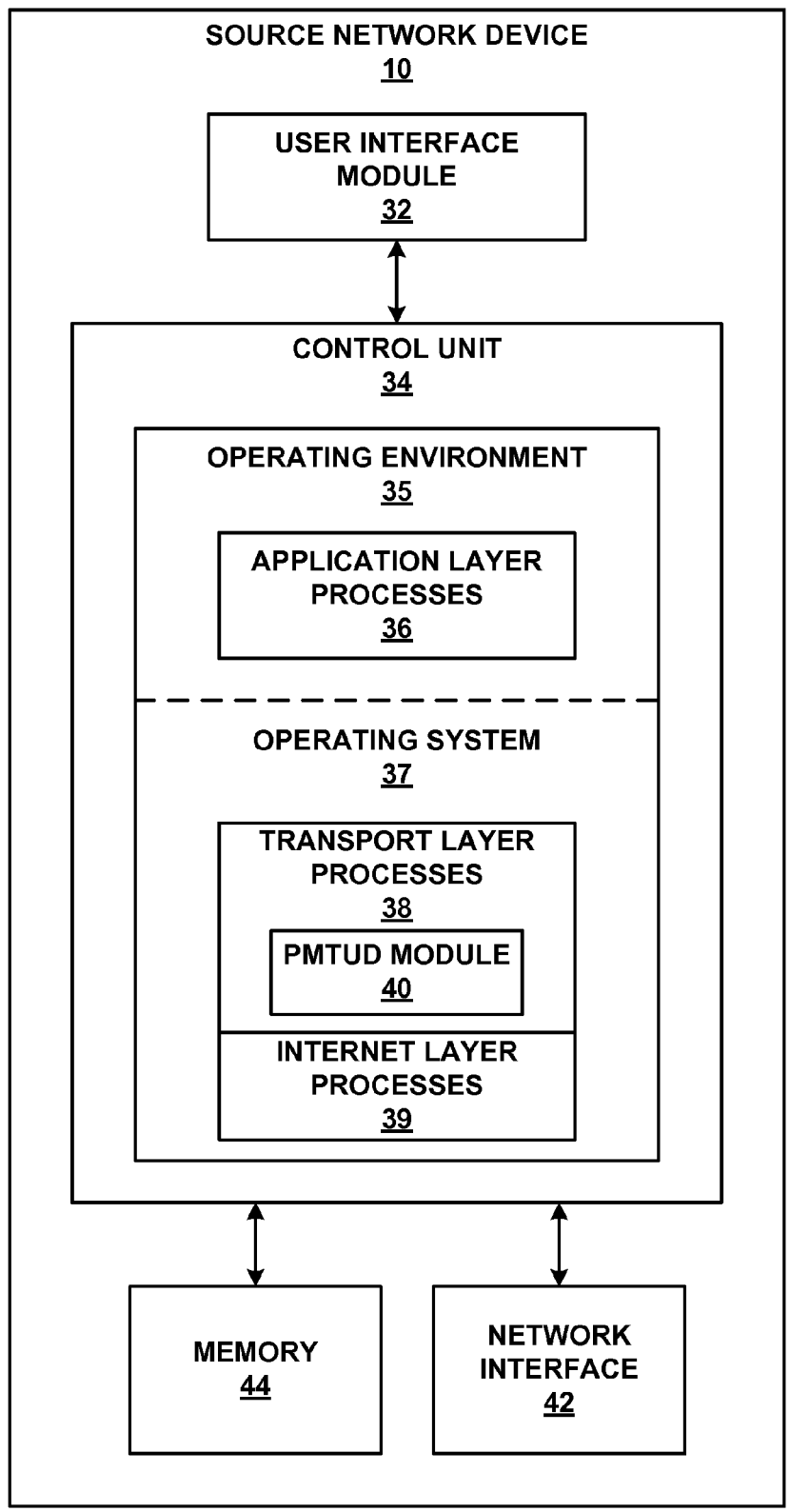
FIG. 2 is a block diagram illustrating an example arrangement of components of a network device that calculates a PMTU for a network path.

FIG. 2 is a block diagram illustrating an example arrangement of components of source network device 10 that calculates a PMTU for a network path. Other network devices similar to source network device 10, such as any intermediate or endpoint network device as described above with respect to FIG. 1, may include the features described with respect to source network device 10 of FIG. 2. For example, source network device 10 may comprise a computing device, a workstation device, a laptop computer, a desktop computer, a server, a printer, a personal digital assistant (PDA), a cellular phone or smart phone, a router, a gateway, a hub, a bridge, a switch, an intrusion detection and prevention device, or other network device. Source network device 10 is generally described as comprising an endpoint device, such as a computing device or server, for the purpose of explanation.

In the example of FIG. 2, source network device 10 comprises user interface module 32, control unit 34, and network interface 42. User interface module 32 causes one or more user interface devices, such as a display, a keyboard, a mouse, a touchscreen, a stylus, a light pen, a microphone, a speaker, or other user interface device of source network device 10 to receive and/or present data from or to a user. For example, user interface module 32 may receive a request from a user to initiate a network session with destination network device 16 (FIG. 2). The request may comprise a request to access a web page of destination network device 16, for example, when destination network device 16 comprises a web server.

Network interface 42 comprises an interface by which source network device 10 communicates with devices of network 18 (FIG. 1), e.g., router 12. Network interface 42 may comprise one or more of a network interface card (NIC), an Ethernet interface, a Gigabit Ethernet interface, a wireless card, a cable modem, a satellite modem, a telephone modem, a DSL modem, or other network interface. Network interface 42 also supports a maximum transmission unit size. In some examples, source network device 10 comprises a plurality of network interfaces, which may each support different MTUs based on the interfaces themselves, links to which the interfaces are connected, and network devices on the other end of these links.

Control unit 34, in one example, comprises hardware for performing one or more of the techniques of this disclosure. In some examples, control unit 34 comprises hardware for executing instructions encoded in memory 44. For example, control unit 34 may comprise one or more processors, one or more microprocessors, digital signal processors (DSPs), application specific integrated circuits (ASICs), field programmable gate arrays (FPGAs), or any other equivalent integrated or discrete logic circuitry, or any combination thereof.

Memory 44 may comprise one or more computer-readable storage media for encoding instructions that cause a processor to perform various procedures or functions. For example, memory 44 may comprise one or more of a hard disk, an optical medium such as a CD-ROM, a floppy disk, a flash drive, a solid state drive, or other magnetic, optical, or flash medium. Memory 44 may be encoded with instructions corresponding to application layer processes 36, transport layer processes 38, Internet layer processes 39, and PMTUD module 40. Control unit 34, in some examples, retrieves and executes the instructions from memory 44 for these modules. In some examples, any or all of application layer processes 36, transport layer processes 38, Internet layer processes 39, and PMTUD module 40 may comprise independent hardware modules that perform the functions attributed thereto. In some examples, control unit 34 also executes instructions for user interface module 32 and/or network interface 42.

In the example of FIG. 2, control unit 34 comprises operating environment 35 and operating system 37. Operating system 37 corresponds to any operating system for an endpoint network device, such as Microsoft Windows, Linux, Unix, Solaris, FreeBSD, or other operating system. In the example of FIG. 2, operating system 37 provides transport layer processes 38, Internet layer processes 39, and PMTUD (PMTU discovery) module 40. Transport layer processes 38 and Internet layer processes 39 comprise implementations of one or more network protocols, such as TCP/IP, the uniform datagram protocol (UDP), the point-to-point protocol (PPP), or other transportation and Internet layer communication protocols. Internet layer processes 39 may also include an implementation of ICMP, although this is not necessary for the techniques of this disclosure.

In the example of FIG. 2, PMTUD module 40 is implemented by operating system 37 within transport layer processes 38. In one example, PMTUD module 40 is executed as part of a TCP implementation to modify TCP in accordance with the techniques of this disclosure. In this manner, PMTUD module 40 may form part of an extended or modified TCP protocol. PMTUD module 40 may therefore correspond to a modified TCP process. Although depicted as operating at the transport layer, PMTUD module 40 may in some example implementations operate at both the transport layer and the Internet layer, e.g., by modifying either or both of the TCP header and the IP header of a packet and calculating the PMTU from an acknowledged TCP sequence number.

Operating environment 35 comprises an environment for processes executing above operating system 37 that interact with services provided by operating system 37. The processes executing in operating environment 35 comprise application layer processes 36, which generally correspond to particular applications of source network device 10. Application layer processes 36 may include, for example, a web browser, an e-mail client, a file transfer program, or other modules for performing various tasks associated with source network device 10.

PMTUD module 40 comprises an example implementation of the techniques of this disclosure for discovering a PMTU for a network path. PMTUD module 40, in one example, sets a DF flag of a first packet of a network session. Upon receiving an acknowledgement for the first packet, PMTUD module 40 calculates the PMTU of the path according to the sequence number of the received acknowledgement. PMTUD module 40 stores the calculated PMTU for each network session in memory 44.

After calculating the PMTU for a network session, control unit 34 resends the data that was dropped from the first packet, in accordance with TCP or other communication protocols of transport layer processes 38 and/or Internet layer processes 39. Control unit 34 sends subsequent packets for the network session in accordance with the calculated PMTU for the network session. PMTUD module 40 may calculate a different PMTU for each of a plurality of network sessions. Accordingly, control unit 34 may send packets for each of the network sessions according to the PMTU determined for the corresponding network session.

Figure 3:
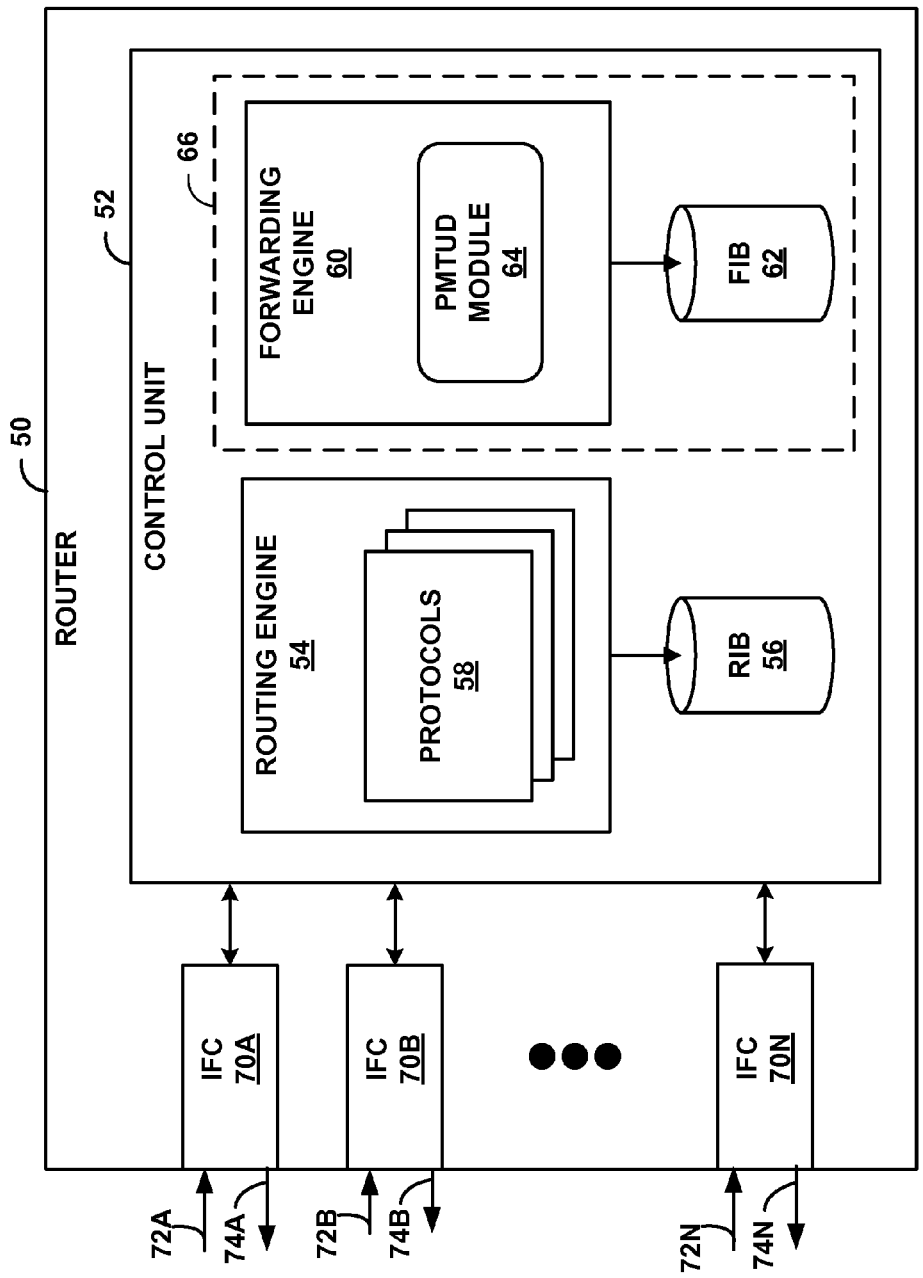
FIG. 3 is a block diagram illustrating an example router that participates in the calculation of a PMTU.

FIG. 3 is a block diagram illustrating an example router 50 that is intermediate to a source device and a destination device and is configured to participate in the calculation of a PMTU. Router 50 may correspond to either of routers 12 or 14 (FIG. 1). In the example of FIG. 3, router 50 comprises interface cards 70A-70N (IFCs 70) and control unit 52. Each of interface cards 70 includes a corresponding set of one of input links 72A-72N (input links 72) and one of output links 74A-74N (output links 74). For example, interface card 70A includes input link 72A and output link 74A. Router 50 receives packets through one of input links 72 and forwards packets intended for another destination out one of links 74. Router 50 may also receive packets intended for itself, e.g., packets from other routers in the network comprising routing information. Routing engine 54 may use data from packets intended for router 50 to calculate routes through the network and store the routes in routing information base 56 according to one or more of protocols 58.

Control unit 52 comprises routing engine 54, forwarding engine 60, routing information base (RIB) 56, and forwarding information base (FIB) 62. In other examples, a router may comprise distinct control units for the routing engine and the forwarding engine, or the forwarding engine and the routing engine may be distributed within each of the IFCs. Control unit 52 may comprise one or more processors, microprocessors, DSPs, FPGAs, ASICs, or other circuitry or hardware for executing, e.g., routing engine 54.

Routing engine 54 comprises protocols 58 that comprise implementations of one or more routing protocols, such as open shortest path first (OSPF), intermediate system to intermediate system (IS-IS), border gateway protocol (BGP), routing information protocol (RIP), interior gateway routing protocol (IGRP), exterior gateway protocol (EGP), or other routing protocols for calculating routes through a network. Routing engine 54 stores calculated routes in RIB 56.

Forwarding engine 60 receives packets from IFCs 70 and forwards the packets through IFCs 70 according to forwarding information stored in FIB 62. FIB 62 generally includes forwarding information corresponding to one or more routes stored in RIB 56. Whereas routes stored in RIB 56 comprise routes throughout a network, e.g., routes from one endpoint to another endpoint, FIB 62 stores data comprising, for example, a lookup table that correlates destinations of packets with one of IFCs 70. In this manner, forwarding engine 60, upon receiving a packet, may identify a destination of the packet and determine one of IFCs 70 through which to forward the packet by performing a lookup in FIB 62.

In the example of FIG. 3, forwarding logic within forwarding engine 60 has been modified to include PMTUD module 64. Instructions for PMTUD module 64 may be stored in a memory or other computer-readable storage medium (not shown) of router 50 and executed by control unit 52. Alternatively, PMTUD module 64 may be embodied within hardware, such as one or more ASICs, that performs the functions described with respect to PMTUD module 64. In other examples, any combination of hardware, software, and firmware may be used to perform the functions described with respect to PMTUD module 64.

PMTUD module 64 modifies certain received packets in accordance with the techniques of this disclosure. For example, when a received packet is larger than the link MTU of the link to the next hop, and when the DF flag for the received packet is set, PMTUD module 64 removes enough data from the packet that the modified packet will not exceed the link MTU of the link to the next hop. In some examples, PMTUD module 64 is configured to remove and discard data from the packet only when the DF flag is set. PMTUD module 64 simply discards the excess, removed data, without fragmenting the packet. In this manner, router 50 need not maintain copies of the packet being modified, but may instead modify the packet in place. Moreover, PMTUD module 64 need not invoke fragmentation logic to fragment the packet, as PMTUD module 64 instead merely modifies the packet headers and payload without creating a true fragmentation of the packet but instead leaves the packet in a form that will be recognized by downstream devices as a properly formed whole packet. Thus these techniques may reduce the possibility of router 50 or other downstream devices becoming overburdened or swamped by executing fragmentation logic. Router 50 also does not discard the packet and does not send an ICMP "destination unreachable" message or other rejection message to the source device upon receiving a packet that is larger than the link MTU and with the DF flag set. Instead, router 50 forwards the modified packet to carry a portion of the original payload of the packet along the link to the next hop according to the link MTU. In some examples, forwarding engine 60 stores each link MTU of outgoing links 74 in tables of FIB 62.

In some examples, PMTUD module 64 modifies header information of TCP and IP headers of the modified packet. PMTUD module 64 may, for example, modify a TCP size, a TCP checksum, an IP length, and an IP checksum. In one example, PMTUD module 64 only adjusts the length value in the IP header. In another example, PMTUD module 64 adjusts the length value in the IP header and the size value of the TCP header. In various examples, PMTUD module 64 may recalculate either or both of the TCP and IP checksums, e.g., while also adjusting either or both of the length value in the IP header or the size value in the TCP header.

In general, PMTUD module 64 ensures that the modified packet comprises a complete IP datagram. That is, PMTUD module 64 does not set the "more fragments" (MF) flag in the IP header for the modified packet. Nor does PMTUD module 64 set a value for the offset value in the IP header for the modified packet. In some examples, PMTUD module 64 clears the MF flag and the offset value of the IP header, to indicate that the packet does not have additional fragments. In this manner, PMTUD module 64 ensures that the modified packet comprises an IP datagram, rather than a packet fragment.

Forwarding engine 60, PMTUD module 64, and FIB 62 comprise a portion of router 50 generally referred to as the forwarding plane 66. Router 50 may modify packets in accordance with the techniques of this disclosure for the purpose of PMTU discovery entirely within components of forwarding plane 66. Therefore, no modification of an existing routing engine 54 or existing protocols 58 is necessary to perform the techniques of this disclosure.

In one example, an intermediate network device, such as router 50, includes a plurality of interface cards configured to receive and forward packets of a network, a forwarding engine configured to determine one of the plurality of interface cards through which to forward a received packet, and to determine a link maximum transmission unit (link MTU) for a link corresponding to the one of the plurality of interface cards, wherein the received packet comprises a header and a payload, and a PMTUD module configured to determine whether a size of the received packet exceeds the link MTU, and to remove a portion of data from the payload of the packet, discard the removed portion, and adjust the header of the received packet according to the removed portion when the size of the received packet exceeds the link MTU.

Figure 4:
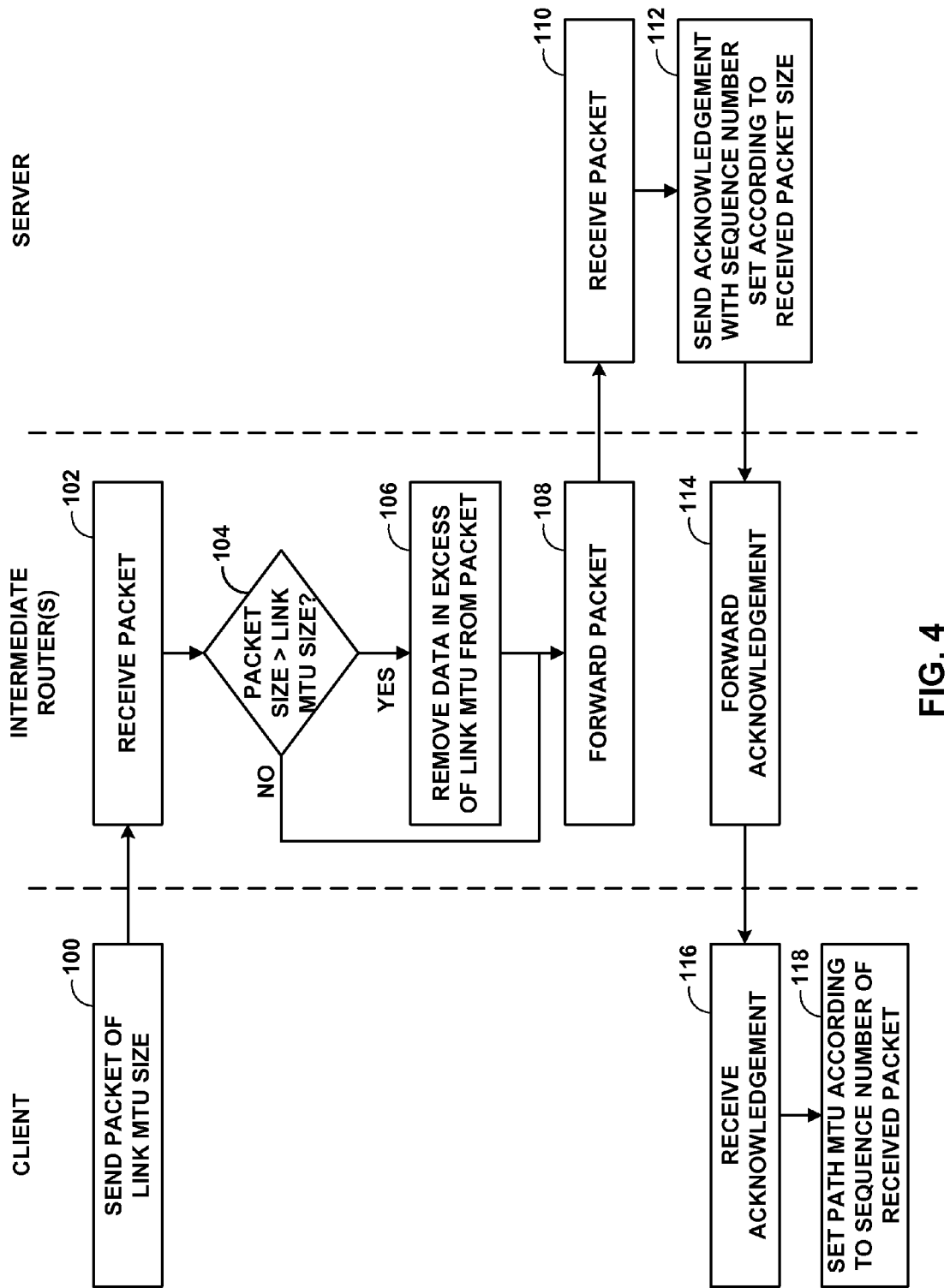
FIG. 4 is a flowchart illustrating an example method for calculating an MTU of a network path.

FIG. 4 is a flowchart illustrating an example method for calculating an MTU of a network path. FIG. 4 depicts three types of devices that participate in this example method: a client operating as a source of a communication session, a server operating as a destination of the communication session and intermediate routers. In general, the client determines the PMTU, the server acknowledges receipt of a packet, and the intermediate routers operate as described herein to remove data from a received packet when the received packet exceeds the link MTU of the next hop link even though the packet may specifically be designated for non-fragmentation. The middle segment of the flowchart in FIG. 4, labeled "intermediate router(s)," may be performed by one or more intermediate network devices, such as routers, switches, gateways, bridges, hubs, or other devices between a client and a server. Although the other segments are labeled "client" and "server," it should be understood that the client may also send data to the server, and the server may receive data from the client.

In general, the method of FIG. 4 is described with respect to source network device 10 as the client, routers 12 and 14 as the intermediate routers, and destination network device 16 as the server. However, it should be understood that the method of FIG. 4 is applicable to other network devices and other intermediate devices as well.

Initially, source network device 10 sends a packet to router 12, destined to ultimately reach destination network device 16, as a first packet carrying application-layer data for the network session (100). This first packet carrying application-layer data generally comprises a packet sent after having established the network session, e.g., after network devices 10, 16 perform the TCP three-way handshake. Source network device 10, in some examples, constructs the packet such that the packet has a size equal to the link MTU of link 20 between source network device 10 and router 12. In some cases, constructing the packet to have the size of the link MTU includes padding the packet with extra data that may be discarded by destination network device 16 or by routers 12, 14. In general, the packet comprises actual application data, although in some cases source network device 10 may pad the first packet with discardable data to ensure that the size is equal to the link MTU of link 20. Source network device 10 also sets the DF flag of the packet.

Router 12 receives the packet from source network device 10 (102). Router 12 identifies a next hop for the packet by performing a next hop look-up in a FIB, such as FIB 62 (FIG. 3). In the example of FIG. 1, the next hop is router 14. Router 12 also determines a link MTU for the link connecting router 12 to the next hop. In some examples, the link MTU is stored in the FIB along with the next hop information. Router 12 determines whether the packet size is greater than the link MTU of the link to the next hop (104). In the example of FIG. 1, router 12 determines whether the packet size is greater than the link MTU of link 22. When the packet does not exceed the link MTU ("NO" branch of 104), router 12 forwards the packet to the next hop (108), which is router 14 in the example of FIG. 1.

When the packet exceeds the link MTU ("YES" branch of 104), router 12 removes data in excess of the link MTU from the packet (106). Router 12 removes data from the payload of the packet such that the size of the remaining payload plus the size of each header is less than or equal to the link MTU of the link to the next hop. In some examples, router 12 also modifies either or both of the TCP and IP headers of the packet. Router 12 then forwards the modified packet to the next hop (108).

In the example of FIG. 1, router 14 then receives the packet from router 12 (102), identifies the next hop for the packet (destination network device 16 in the example of FIG. 1) and determines whether the packet size exceeds the link MTU of link 24 to the next hop (104), removes data when necessary (106), recalculates the packet headers when data is removed, and forwards the modified packet to the next hop (108). Thus, although depicted as being sent to the server in FIG. 4, it should be understood that each intermediate device may send the packet to another intermediate device before the packet ultimately reaches the server (destination network device 16 in the example of FIG. 1), and each intermediate device may remove additional portions of the application-layer data from the payload in the event the MTU for the next link to be traversed is less than the packet's current size.

Destination network device 16 then receives the modified packet from router 14, possibly being modified by multiple intermediate devices (110). In response, destination network device 16 sends an acknowledgement of the actual number of bytes that were received in the modified packet (112). In accordance with TCP, destination network device 16 sends an acknowledgement with a sequence number equal to the initial sequence number plus the number of bytes of data in the received packet plus one. That is, for initial sequence number X, and for packet size Y, destination network device 16 sends an acknowledgement comprising sequence number X+Y+1. In accordance with TCP, this acknowledgement informs source network device 10 that destination network device 16 has received all bytes of the network session corresponding to sequence numbers less than (X+Y+1). Destination network device 16 sends the acknowledgement to router 14, which forwards the acknowledgement to router 12 (114), which forwards the acknowledgement to source network device 10 (114), which ultimately receives the acknowledgement (116).

Source network device 10 then calculates the PMTU of path 26 between source network device 10 and destination network device 16 based on the received acknowledgement, and configures transport layer processes 38 and Internet layer processes 39 to send packets that conform to the calculated PTMU (118). In particular, for initial sequence number X, and for received sequence number Z, source network device 10 calculates the PMTU as (Z−X−1), which is also equivalently expressed as (Z−(X+1)). Source network device 10 re-sends the data of the first packet that was not acknowledged. After this determination, source network device 10 sends packets comprising at most (Z−X−1) bytes to destination network device 16 as part of this network session.

In some examples, source network device 10 may re-institute the method of FIG. 4 at various times to periodically recalculate the PMTU. For example, upon a change to routes that alters the path 26, devices may be configured to recalculate the PMTU in accordance with the techniques. In some examples, source network device 10 and destination network device 16 perform the techniques of this disclosure with the periodicity described in RFC 1191 to dynamically increase the size of the PMTU. For example, source network device 10 may periodically, but relatively infrequently, send a packet comprising more data than the calculated PMTU, where the packet indicates that it is not to be fragmented, e.g., by setting the DF flag. If destination network device 16 acknowledges an amount of data greater than the currently calculated PMTU, source network device 10 may increase the size of the PMTU. In one example, in accordance with RFC 1191, source network device 10 will not attempt to increase the PMTU again for a certain period of time after an unsuccessful increase attempt, such as five minutes. However, when source network device 10 determines that the full amount of data of the larger packet has been acknowledged, source network device 10 may attempt to increase the size of the PMTU further by sending an even larger packet, e.g., approximately one minute after the most recent PMTU increase. Other examples utilize twice these time values, that is, ten minutes for an increase after an unsuccessful increase attempt and two minutes for an increase after a successful increase attempt, in accordance with the recommendations of RFC 1191.

In some examples, source network device 10 also dynamically reduces the PMTU, e.g., when a route change occurs such that, for a new route, at least one link along the new route does not support the previous PMTU. In such a case, although source network device 10 sends packets comprising data corresponding to the PMTU, destination network device 16 will only acknowledge a portion of each sent packet that is less than the PMTU. For example, assuming that the current PMTU is 1500 bytes and the most recent acknowledgement is 5001, source network device 10 will send packets 5001-6500, 6501-8000, 8001-9500, 9501-11000, and 11001-12500, assuming a TCP window of size 5. Assuming that the route has changed such that the largest MTU supported by all links along the new route is 500 bytes, destination network device 16 will send acknowledgements 5501 (for packet 5001-6500), 7001 (for packet 6501-8000), 8501 (for packet 8001-9500), 10001 (for packet 9501-11000), and 11501 (for packet 11001-12500). From these acknowledgements, source network device 10 will dynamically determine the PMTU as 500 bytes and resend the unacknowledged data of each packet (bytes 5501-6500, 7001-8000, 8501-9500, 10001-11000, and 11501-12500, in this example). Source network device 10 also sends packets comprising 500 bytes of data following the retransmission.

In contrast to conventional techniques, in this example, source network device 10 does not initiate congestion control as a result of having received an acknowledgement that acknowledges receipt of less than the full amount of data sent to destination network device 16. When, after having determined the PMTU, source network device 10 sends a packet that destination network device 16 does not acknowledge, source network device 10 may initiate congestion control, e.g., by reducing transmission rate. However, source network device 10 is configured to determine that, for the first packet, any loss of data is caused by the packet having exceeded the MTU of at least one link, rather than congestion. Accordingly, source network device 10 need not begin congestion control when less than the full amount of data of the first packet is acknowledged by destination network device 16.

The following example assumes, with respect to the devices shown in FIG. 1, that the link MTU of link 20 is 5,000 bytes, the link MTU of link 22 is 2,500 bytes, and the link MTU of link 24 is 500 bytes. Source network device 10 originally sends a packet of 5,000 bytes of data to router 12 with the DF flag of the packet set, destined for destination network device 16, to router 12 as the next hop along the path to destination network device 16. Router 12 identifies the next hop to which to output the packet toward destination network device 16, and determines the link MTU associated with this next hop (here, 2,500 bytes). Router 12 determines that a size of the packet is larger than the link MTU of the link to the next hop, so router 12 removes 2,500 bytes of data from the payload, recalculates headers, and sends the remaining 2,500-byte packet to router 14. Router 14 determines that the 2,500-byte packet received from router 12 is larger than the link MTU of the link to the next hop (500 bytes) by looking up the next hop in a FIB and the corresponding link MTU of the link to the next hop, so router 14 removes 2,000 bytes of data from the payload, recalculates headers, and sends the remaining 500-byte packet to destination network device 16. Destination network device 16 receives the 500-byte packet from router 14, and acknowledges receipt of the 500 bytes of data that were received by sending to source network device 10 an acknowledgement having a sequence number comprising an initial sequence number plus 500 plus one. Source network device 10 determines that the PMTU of path 26 to reach destination network device 16 is equal to the sequence number of the acknowledgement minus the initial sequence number minus one, which is 500 in this example. This example ignores the size of packet headers, but illustrates the techniques described in this disclosure.

Figure 5:
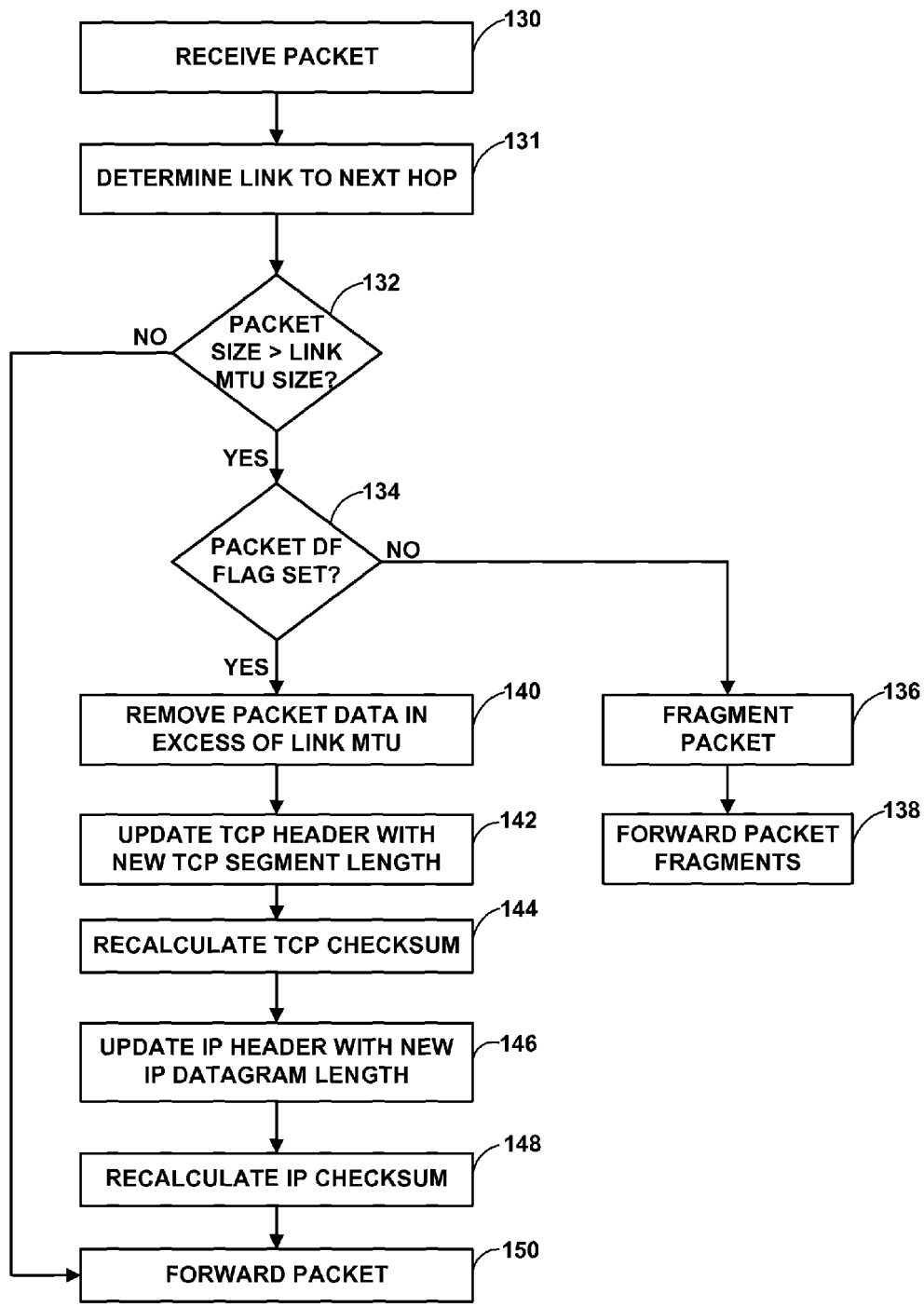
FIG. 5 is a flowchart illustrating an example method of modifying a packet to assist a network device in calculating the MTU of a path.

FIG. 5 is a flowchart illustrating an example method of modifying a packet by a router to assist a network device in calculating the MTU of a path. The method of FIG. 5 is generally described with respect to router 50 (FIG. 3). However, other network devices, such as router 12, router 14, or switches, gateways, hubs, intrusion detection and prevention devices, firewalls, or other intermediate network devices, may also perform a method similar to the method described with respect to FIG. 5.

Initially, router 50 receives a packet (130). Forwarding engine 60 performs a lookup in FIB 62 to determine one of IFCs 70 through which to forward the packet to reach a next hop along a route to the final network destination of the packet (131). Forwarding engine 60 also determines whether the size of the packet is greater than the link MTU of the link to the next hop (132). In one example, forwarding engine 60 retrieves the link MTU of the link to the next hop from FIB 62. When the size of the packet is less than or equal to the link MTU of the link to the next hop ("NO" branch of 132), forwarding engine 60 forwards the packet to the next hop (150). The size of the packet includes the size of the payload as well as the size of any headers of the packet.

When the size of the packet is greater than the link MTU of the link to the next hop ("YES" branch of 132), forwarding component 60 determines whether the "don't fragment" (DF) flag in the IP header of the packet is set (134). In one example, the flag comprises a one-bit number that is "set" when the value is equal to one and "cleared" when the value is equal to zero. In the example of FIG. 5, when forwarding component 60 determines that the DF flag is not set, e.g., has a value of zero ("NO" branch of 134), forwarding component 60 fragments the packet (136). That is, in this example, forwarding component 60 breaks the payload of the packet into a plurality of packet fragments in accordance with TCP/IP packet fragmentation. For example, forwarding component 60 sets the "more fragments" flag of the IP header in each of the fragments except for the last fragment, as well as setting offset values in the IP header. Forwarding component 60 also forwards each of the packet fragments (138). However, in some examples, router 50 may be configured to not fragment any packets.

When forwarding component 60 determines that the DF flag of the packet is set, ("YES" branch of 134), router 50 removes data from the payload of the packet in excess of the link MTU of the link to the next hop (140). In the example of FIG. 4, PMTUD module 64 also updates the size value of the TCP header (142), recalculates the TCP checksum (144), updates the length value of the IP header (146), and recalculates the IP checksum (148). In other examples, router 50 may perform any, all, or none of updating the size value in the TCP header, updating the length value of the IP header, recalculating the TCP checksum, and/or recalculating the IP checksum. In any case, PMTUD module 64 does not set the MF flag, nor an offset value, in the IP header of the modified packet. Therefore, the modified packet comprises an IP datagram, rather than a packet fragment. Forwarding component 60 then forwards the modified packet to the next hop along the route (150).

In one example, a method similar to the method of FIG. 5 includes receiving, with an intermediate network device, a packet comprising a header and a payload, determining a link MTU for a link to a next hop for the packet, when a size of the packet exceeds the link MTU, removing, with the intermediate network device, a portion of data from the payload of the packet, discarding the removed portion, and adjusting the header of the packet according to the removed portion, and forwarding the packet to the next hop.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" generally refers to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium generally cause a programmable processor, or other processor, to perform the method, e.g., when the instructions are executed. Computer readable storage media include, for example, random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. A method comprising:
   receiving, with an intermediate network device, a packet comprising a header and a payload, wherein the header of the packet indicates that the packet is not to be fragmented;
   determining a link maximum transmission unit (link MTU) for a link from the intermediate device to a next hop for the packet;
   determining that a size of the packet exceeds the link MTU;
   after determining that the size of the packet exceeds the link MTU, removing, with the intermediate network device, a portion of data from the payload of the packet so that the size of the packet no longer exceeds the link MTU;
   discarding the removed portion and adjusting the header of the packet according to a remaining portion of the payload to form a modified packet; and
   forwarding the modified packet to the next hop.

2. The method of claim 1, wherein the intermediate network device comprises a router.

3. The method of claim 1, further comprising determining whether a "don't fragment" (DF) flag of the header is set and modifying the packet only when the DF flag of the header is set, wherein the DF flag of the header being set indicates that the packet is not to be fragmented.

4. The method of claim 3, wherein forwarding the modified packet comprises forwarding the modified packet without sending an Internet control message protocol (IMCP) destination unreachable message when the DF flag of the header is set and when the size of the packet exceeds the link MTU.

5. The method of claim 1, wherein the remaining portion of the packet comprises the difference between the payload of the packet and the removed portion of the packet.

6. The method of claim 1, wherein the header comprises a transmission control protocol (TCP) header, wherein adjusting the header of the packet comprises adjusting a size value of the TCP header according to the remaining portion of data.

7. The method of claim 1, wherein the header comprises an Internet protocol (IP) header, wherein adjusting the header of the packet comprises adjusting a length value of the IP header according to the remaining portion of data.

8. The method of claim 1, wherein the header comprises a checksum value, wherein adjusting the header comprises recalculating the checksum value according to the remaining portion of the payload and setting the checksum value of the header equal to the recalculated checksum value.

9. The method of claim 1, wherein discarding the removed portion comprises dropping data of the removed portion without the intermediate network device forwarding the data of the removed portion.

10. The method of claim 1, wherein adjusting the header comprises adjusting the header of the packet such that the packet is not a packet fragment.

11. An intermediate network device comprising:
    a plurality of interface cards configured to receive and forward packets of a network;
    a forwarding engine configured to determine one of the plurality of interface cards through which to forward a received packet, and to determine a link maximum transmission unit (link MTU) for a link corresponding to the one of the plurality of interface cards, wherein the received packet comprises a header and a payload wherein the header of the packet indicates that the packet is not to be fragmented; and
    a path maximum transmission unit determination (PMTUD) module configured to determine whether a size of the received packet exceeds the link MTU, wherein the PMTUD module is configured to, when the size of the received packet exceeds the link MTU, modify the packet by removing a portion of data from the payload of the packet so that the size of the packet no longer exceeds the link MTU, discarding the removed portion, and adjusting the header of the packet according to a remaining portion of the payload.

12. The device of claim 11, wherein the intermediate network device comprises a router.

13. The device of claim 11, wherein the PMTUD module is further configured to determine whether a "don't fragment" (DF) flag of the header is set and to remove the portion of data from the payload of the received packet only when the DF flag of the header is set, wherein the DF flag of the header being set indicates that the packet is not to be fragmented.

14. The method of claim 11, wherein the header comprises a transmission control protocol (TCP) header, and wherein the PMTUD module is configured to adjust a size value of the TCP header according to the remaining portion of data.

15. The device of claim 11, wherein the header comprises an Internet protocol (IP) header, and wherein the PMTUD module is configured to adjust a length value of the IP header according to the removed portion of data.

16. The device of claim 11, wherein the header comprises a checksum value, and wherein the PMTUD module is configured to adjust the header by recalculating the checksum value according to the remaining portion of the payload and setting the checksum value of the header equal to the recalculated checksum value.

17. The device of claim 11, wherein the remaining portion of the packet comprises a difference between the payload and the removed portion.

18. The device of claim 11, wherein a forwarding plane comprises the forwarding engine and the PMTUD module 64.

19. A non-transitory computer-readable medium encoded with instructions for causing a programmable processor of an intermediate network device to:
   receive a packet comprising a header and a payload wherein the header of the packet indicates that the packet is not to be fragmented;
   determine a link maximum transmission unit (link MTU) for a link to a next hop for the packet;
   determine that a size of the packet exceeds the link MTU;
   after determining that the size of the packet exceeds the link MTU, remove a portion of data from the payload of the packet so that the size of the packet no longer exceeds the link MTU;
   discard the removed portion and adjust the header of the packet according to a remaining portion of the payload; and
   forward the packet to the next hop.

20. The non-transitory computer-readable medium of claim 19, further encoded with instructions to determine whether a "don't fragment" (DF) flag of the header is set, wherein the instructions to remove comprise instructions to remove the portion of data only when the DF flag of the header is set, wherein the DF flag of the header being set indicates that the packet is not to be fragmented.

21. The non-transitory computer-readable medium of claim 19, wherein the header comprises a transmission control protocol (TCP) header, wherein the instructions to adjust the header of the packet comprise instructions to adjust a size value of the TCP header according to the removed portion of data.

22. The non-transitory computer-readable medium of claim 19, wherein the header comprises an Internet protocol (IP) header, wherein the instructions to adjust the header of the packet comprise instructions to adjust a length value of the IP header according to the removed portion of data.

23. The non-transitory computer-readable medium of claim 19, wherein the header comprises a checksum value, wherein the instructions to adjust the header of the packet comprise instructions to recalculate the checksum value according to the remaining portion of the payload and to set the checksum value of the header equal to the recalculated checksum value.

24. The non-transitory computer-readable medium of claim 19, wherein the remaining portion of the payload comprises a difference between the payload and the removed portion of the payload.

25. A method comprising:
   sending, with a first network device, a packet to a second network device, wherein the packet comprises a header and a payload, wherein the payload comprises application-layer data, wherein the header comprises an initial sequence number, and wherein the header of the packet indicates that the packet is not to be fragmented;
   receiving an acknowledgement for the packet comprising an acknowledgement sequence number; and
   calculating, with the first network device, a path maximum transmission unit (PMTU) according to a difference between the acknowledgement sequence number and the initial sequence number.

26. The method of claim 25, wherein sending comprises sending the packet to a router along a route to the second network device, further comprising setting a "don't fragment" (DF) flag of the header of the packet before sending the packet to the router, wherein the DF flag indicates that the packet is not to be fragmented.

27. The method of claim 25, wherein the initial sequence number comprises a value X, wherein the acknowledgement sequence number comprises a value Y, and wherein calculating the PMTU comprises calculating the PMTU as being equal to $Y-(X+1)$.

28. The method of claim 25, wherein the initial sequence number comprises a sequence number of the packet sent to the second network device after performing a transmission control protocol (TCP) three-way handshake.

29. The method of claim 25, further comprising determining a link MTU of a link to a next hop along a path to reach the second network device, wherein sending the packet comprises forming the packet as having a size equal to the determined link MTU.

30. The method of claim 25, further comprising suppressing initiation of congestion control when the acknowledgement indicates that data received by the second network device is less than an amount of data of the packet sent to the second network device.

31. The method of claim 25, wherein calculating comprises calculating the PMTU with a modified transmission control protocol (TCP) process.

32. A network device comprising:
   a network interface configured to send a packet to a second network device, wherein the packet comprises a header and a payload, wherein the payload comprises application-layer data, and wherein the header comprises an initial sequence number, wherein the header of the packet indicates that the packet is not to be fragmented, and to receive an acknowledgement for the packet comprising an acknowledgement sequence number; and
   a path maximum transmission unit determination (PMTUD) module configured to calculate a path maximum transmission unit according to a difference between the acknowledgement sequence number and the initial sequence number.

33. The network device of claim 32, wherein the PMTUD module comprises a modified transmission control protocol (TCP) process executing at a transport layer of the network device.

34. The network device of claim 32, wherein the PMTUD module is configured to set a "don't fragment" (DF) flag of the header of the packet before the packet is sent to the second network device, wherein the DF flag indicates that the packet is not to be fragmented.

35. The network device of claim 32, wherein the PMTUD module is configured to suppress congestion control when the acknowledgement indicates that data received by the second network device is less than an amount of data of the packet sent to the second network device.

* * * * *